(No Model.)  2 Sheets—Sheet 1.

G. M. HUBBARD.
COUPLING FOR VEHICLE SPRINGS.

No. 320,135.  Patented June 16, 1885.

WITNESSES:
Geo. L. Barnes.
David K. Andrews

INVENTOR
George M. Hubbard
BY
Julius Twiss
ATTORNEY (No Model.)  2 Sheets—Sheet 2.

G. M. HUBBARD.
COUPLING FOR VEHICLE SPRINGS.

No. 320,135. Patented June 16, 1885.

WITNESSES:
George L. Barnes.
David K. Andrews.

INVENTOR
George M. Hubbard
BY Julius Twiss
ATTORNEY

UNITED STATES PATENT OFFICE.

GEORGE M. HUBBARD, OF NEW HAVEN, CONNECTICUT.

COUPLING FOR VEHICLE-SPRINGS.

SPECIFICATION forming part of Letters Patent No. 320,135, dated June 16, 1885.

Application filed May 4, 1885. (No model.)

*To all whom it may concern:*

Be it known that I, GEORGE M. HUBBARD, a citizen of the United States, residing at New Haven, in the county of New Haven and State of Connecticut, have invented a new and useful Improvement in Couplings for Vehicle-Springs, of which the following is a specification.

My invention relates to an improvement in that class of carriage-springs which are arranged at the sides of the vehicle-body, and connected to transverse end springs or cross-bars. When the side and end springs of a vehicle are connected at their ends, the coupling which thus secures them must be adapted to allow the springs to rock or roll upon each other, and also to slide or traverse over each other correspondingly as the springs are deflected under the load and strains of the vehicle.

My invention consists in a novel coupling adapted to connect the ends of the springs, and permit the several motions aforesaid, as hereinafter more fully described and claimed.

Figure 1:
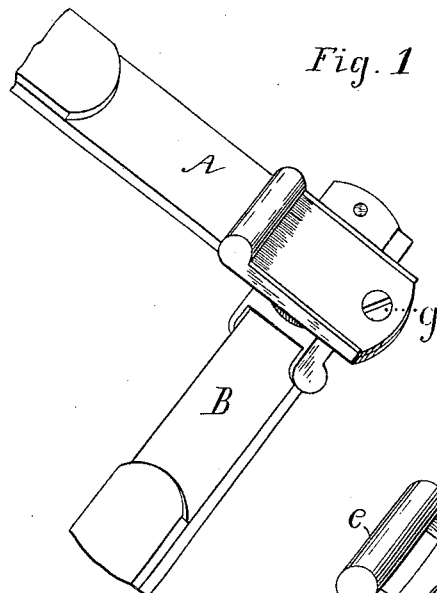
Figure 2:
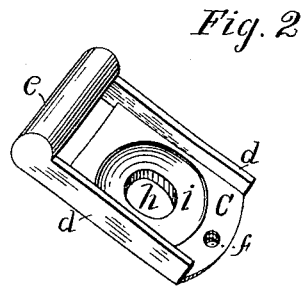
Figure 4:
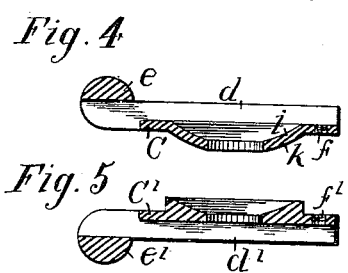
Figure 5:
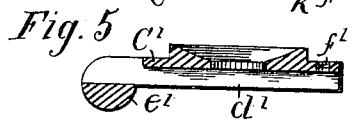
Figure 3:
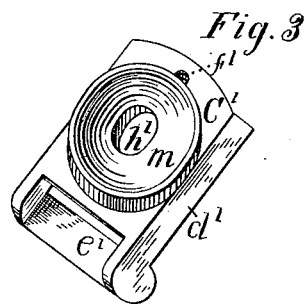
Figure 6:
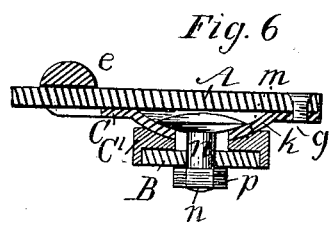
Figure 7:
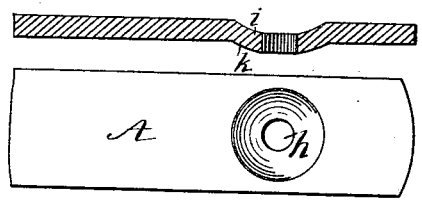
Figure 8:
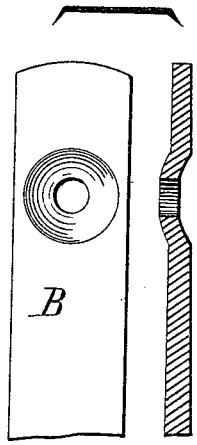
Figure 9:
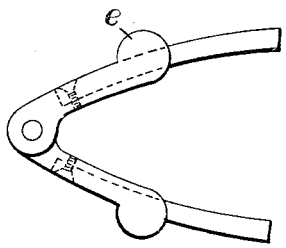

In the accompanying drawings, Figure 1 shows a perspective view of my improved coupling. Figs. 2 and 3 show, respectively, the upper and lower coupling-plates detached. Fig. 4 shows a longitudinal section centrally through the upper plate, and Fig. 5 shows a similar section through the lower plate. Fig. 6 is a longitudinal section through the coupling, showing both plates connnected, and Figs. 7, 8, and 9 are modifications.

In the drawings, A denotes the end portion of a vehicle side spring, and B the corresponding part of an end spring. The springs are arranged at right angles, and with the ends crossed, as shown, but preferably with the spring uppermost. On the lower side of the side spring is a plate, C, which has side flanges, $d$, equal in height to the thickness of the spring. At the inner end of the plate a bridge, $e$, extends across the flanges above the spring, and serves to hold the spring on the plate. At the outer end of the plate is a threaded perforation, $f$, which receives a screw, $g$, secured through the end of the spring, and the screw, flange, and bridge combined hold the plate firmly in place on the spring. Through the center of the plate C is a perforation, $h$, and around the perforation the plate is formed cup-shaped, with a concave surface, $i$, on the upper side, and a convex surface, $k$, on the lower or opposite side. A plate, C', is secured upon the extremity of the end spring, B, precisely in the same manner as the plate C is secured by means of similar flanges, $d'$, bridge $e'$, and threaded perforation $f'$. The plate C' is inverted, and is fastened on the upper side of the spring, with the bridge $e'$ underneath. In the center of the plate C' is a perforation, $h'$, corresponding to the perforation $h$ in the plate C, and around the perforation $h'$ is a raised cup-shaped seat, $m$, adapted to receive the convex surface $k$ on the lower side of the plate C.

Constructed as above described and shown, the plate C' is secured on the end of spring B in the manner set forth, and the upper plate, C, is then coupled to the lower plate by a bolt, $n$, passed down through the perforations $h$ $h'$ and through the spring B, and secured by a suitable nut, P, under the spring. The lower side of the head of the bolt is made convex to fit the concavity $i'$ in the plate C, and the plate C can therefore rock in the seat $m$ and slide under the bolt-head, the perforation $h$ in the plate being sufficiently large to allow the requisite movement of the plate. The perforation $h'$ in the lower plate may be of the exact size of the bolt, or made larger, as shown, to receive any suitable elastic packing material to prevent rattling of the bolt. The side spring, A, is secured in place after the bolt $n$ is inserted, and covers the bolt-head. As there are two side and two end springs in the class of springs herein described, there are consequently four coupling-joints in a complete set, but as all are similar a description of one coupling alone will suffice.

It is evident that this device may be used as well when the side springs, A, are connected to simple cross-bars instead of end springs, the lower plate, C', in such case being made to fit the bar instead of the spring. It is also evident that the coupling may be inverted and the plate C' placed uppermost; but the construction shown is preferred.

If desired, the cup-shaped bearings $m$, $i$, and $k$ may be formed in the springs, as shown in Figs. 7 and 8, and the plates C C' dispensed with. It is also evident that the nut P may be dispensed with and the bolt $n$ be screwed into the spring B.

The plate C, fastened to a spring by means of the bridge e, and a suitable screw may be commonly used for securing the end of a spring under various conditions—as, for instance, to connect ordinary elliptic springs together—as shown in Fig. 9. In this case the plates are provided with simple hinge-ears and hinged together; but they are always formed with the bridge e and fastened by a suitable screw or bolt through the extreme end of the spring. This method of fastening does not weaken the spring, because it is perforated at a point where there is little strain, as the greater part of the strain is sustained by the bridge.

I claim as new and desire to secure by Letters Patent—

1. A coupling for vehicle-springs consisting, essentially, of two flanged plates each secured to its spring by a bridge or arch and screw, and having a central perforation, one plate being provided with a raised concave seat concentric with the central perforation, and the other being formed with two opposite bearing-surfaces concentric with each other and with the central perforation, one surface convex and adapted to fit on the seat in the opposite plate, and the other concave and adapted to form a seat for the head of a coupling-bolt secured through the plates, all arranged in the manner and for the purpose substantially as set forth.

2. On a plate for coupling vehicle springs, a bridge or arch adapted to hold the plate against the spring, as and for the purpose specified.

3. In a coupling for vehicle-springs, the flanged plate C, having a central perforation, $h$, with bearing-surfaces concentric thereto on each side of the plate, one surface being concave and the other convex, substantially as and for the purpose described.

4. In a coupling for vehicle-springs, the flanged plate C', having a central perforation, $h'$, and a raised concave bearing-surface concentric therewith, substantially as and for the purpose described.

5. The combination, with the plate C, having flanges $d$, bridge $e$, perforation $h$, concave surface $i$, and convex surface $k$ on its opposite side, of the plate C', having flanges $d'$, bridge $e'$, perforation $h'$, and concave seat $m$, and the bolt $n$, in the manner and for the purpose described.

GEORGE M. HUBBARD.

Witnesses:
EDWIN C. DOW,
WALTER POND.